March 20, 1962 F. A. SCHOEPE ET AL 3,025,748
OPTICAL CONTOUR GAUGE
Filed Sept. 10, 1957 5 Sheets-Sheet 1

INVENTORS
FRED A. SCHOEPE
HERBERT J. VENABLES III
BY
ATTORNEYS

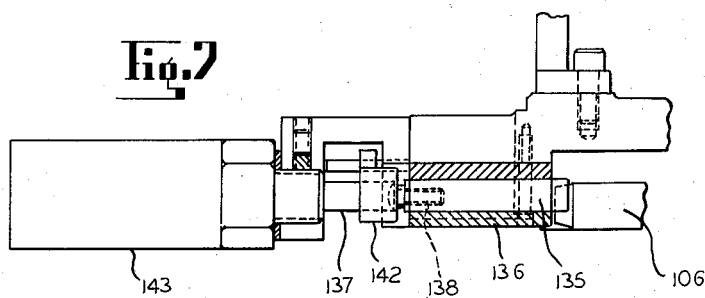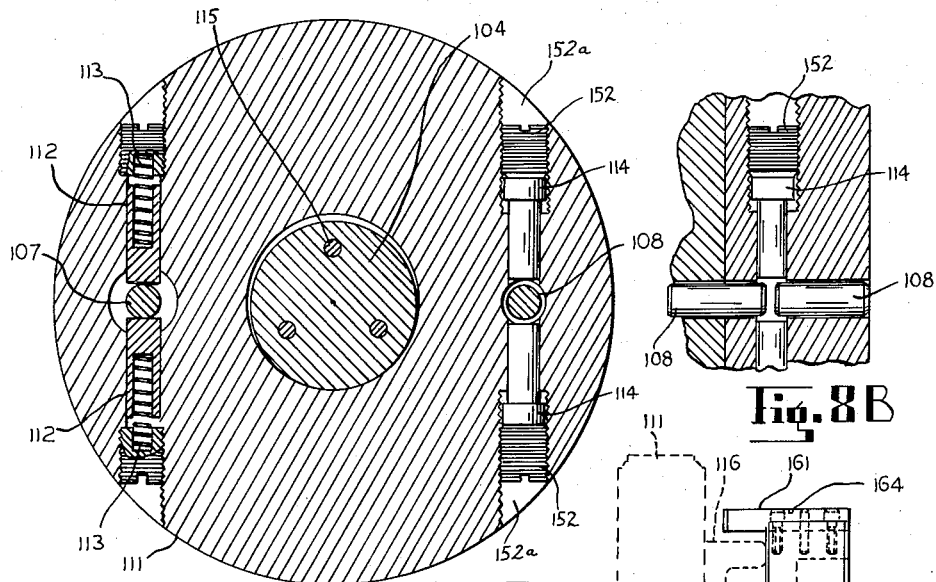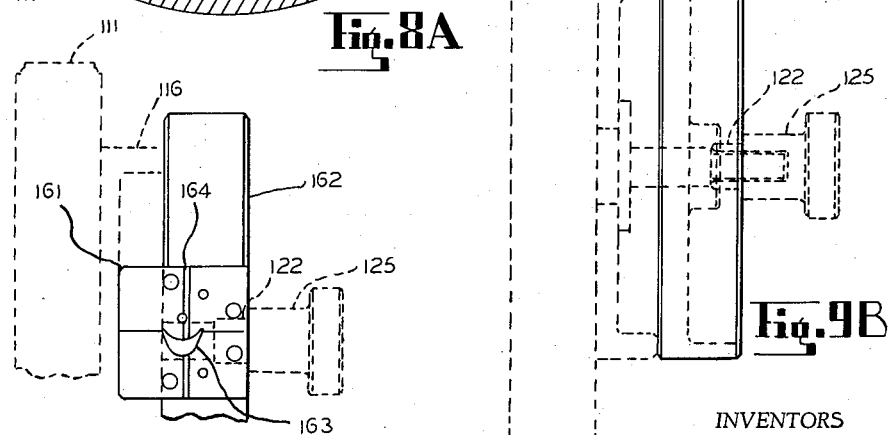

United States Patent Office 3,025,748
Patented Mar. 20, 1962

3,025,748
OPTICAL CONTOUR GAUGE
Fred A. Schoepe and Herbert J. Venables III, Cleveland, Ohio, assignors to Thompson Ramo Wooldridge Inc., a corporation of Ohio
Filed Sept. 10, 1957, Ser. No. 683,051
2 Claims. (Cl. 88—14)

The present invention relates in general to apparatus for optical gauging and more particularly concerns a novel optical gauge for checking the contours of small parts and the relative orientation of one contoured portion to the other with exceptional rapidity and accuracy, and in a manner which minimizes the chances for human error. In a specific aspect of the invention, the contours of and spacing between blades of a miniature turbine wheel used in a guided missile engine are rapidly and accurately checked.

In order to provide missiles capable of reaching small targets after being automatically directed over long distances engines capable of supplying large thrust for relatively long time intervals are required. Rocket engines provide sufficient thrust, but not for a sufficiently long time. Accordingly, such missiles are powered by turbine engines, similar in principle to those associated with jet aircraft.

In order to fit in the slim fuselage of a missile, such engines must necessarily be of smaller size than engines employed in conventional jet aircraft. Yet, in order to provide the necessary thrust for propelling the associated missile at the desired speeds, the angular velocity of the turbine wheels in the missile jet engines must be exceedingly high. In order to avoid damaging stresses, the turbine wheel must be carefully designed and the contours of and relative spacing between turbine wheel blades maintained within precise tolerances. Yet, the checking of blade contours on small turbine wheels become quite a difficult problem, not only because of the precise tolerances required of the small radii of curvature which bound the contour, but also because the center points from which these radii emanate must be located precisely. Moreover, these center points are loci floating in space. It is quite evident that checking these contours with conventional feeler gauges would present serious problems and require much time to check the contour of a single blade.

It would thus be desirable to check the contour in a manner which eliminates the need for determining the center points which float in space and would not require the use of feeler gauges. This can be accomplished by establishing a tolerance region between parallel bands, which region conforms generally to the shape of the desired contour. There are available optical projection systems which would permit the contour of a small part to be magnified and projected upon a screen which might also contain the aforesaid tolerance region. However, such systems require a large floor space in order to accommodate the projector and viewing screen. Moreover, in order to see the projected image, this area must be curtailed in. Another disadvantage of such systems is that a reflection lens is required.

Such projection systems do not provide a convenient means for checking the spatial relationship between first and second contours of a small part while substantially simultaneously checking the contour. It would be difficult to adapt the projector to check the relative orientation of such contours since the relative orientation of the viewing screen and the projector would have to be maintained to within very precise tolerances.

The present invention contemplates and has as a primary object the provision of a method and means for optically gauging the contours of a small part and the spacing between selected contours.

Another object of the invention is to provide an optical gauge for checking the contours of small parts, which gauge is of compact, relatively low-cost design and operable in the normal surroundings of a factory production line.

Another object of the invention is the provision of an optical gauge for directly viewing the contour of the small part being checked relative to a desired tolerance region.

A further object of the invention is the provision of a means for checking not only the contours of the blades of a small turbine wheel, but also the position of one blade relative to another.

According to the invention, there is provided a low powered microscope referred to herein as a macroscope associated with an eyepiece having a reticule with a tolerance region thereon defined by a pair of substantially parallel curves generally of the same shape as the contour of the small part being checked. The macroscope and small part are relatively aligned so that when the former is viewed through the latter, its contour, if passable, that is to say, within tolerance, is seen to lie entirely within the aforesaid tolerance region.

According to another aspect of the invention, the small part and macroscope are relatively reoriented by a predetermined amount whereby a portion of the small part having a similar contour is viewed through the macroscope and seen to be displaced along a predetermined direction from the aforesaid tolerance region by no more than a preselected amount when the relative spacing between the two contours of the part is within tolerance. Relative motion is then imparted between the macroscope and part along the predetermined direction by no more than the preselected amount until the second contour is seen entirely within the tolerance region. This indicates both that the second contour and relative spacing between first and second contours are within tolerance.

Other features, objects and advantages of the invention will become apparent from the following specification when read in connection with the accompanying drawings, in which:

FIG. 7 is a section along line VII—VII of FIG. 6;

FIG. 8A is a section along line VIII—VIII of FIG. 5;

FIG. 8B is a detailed view of the screw adjusting means appearing at the right in FIG. 8A; and FIGS. 9A and 9B are top and side views respectively of a jib positioned to initially align the macroscope.

Figures 1, 2:
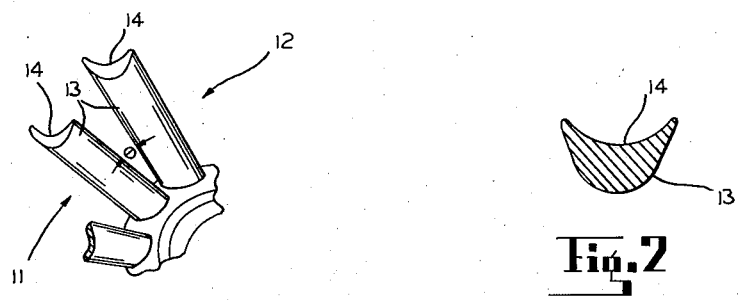
FIG. 1 is a fragmentary view of a typical small turbine wheel to illustrate generally the shape of a blade contour and the relative spacing between blades.
FIG. 2 illustrates a typical blade contour.

In the drawing corresponding elements in the different views are identified by the same reference symbol. With reference to the drawing, and more particularly FIG. 1 thereof, there is illustrated a fragmentary drawing of a turbine wheel having blades 11 and 12 each with an upper cambered surface 13 and lower cambered surface 14. These surfaces must be shaped within close tolerances and the angular spacing between blades must also be maintained precisely in order to avoid severe vibration at the high angular velocities at which the turbine wheel operates.

Figure 3:
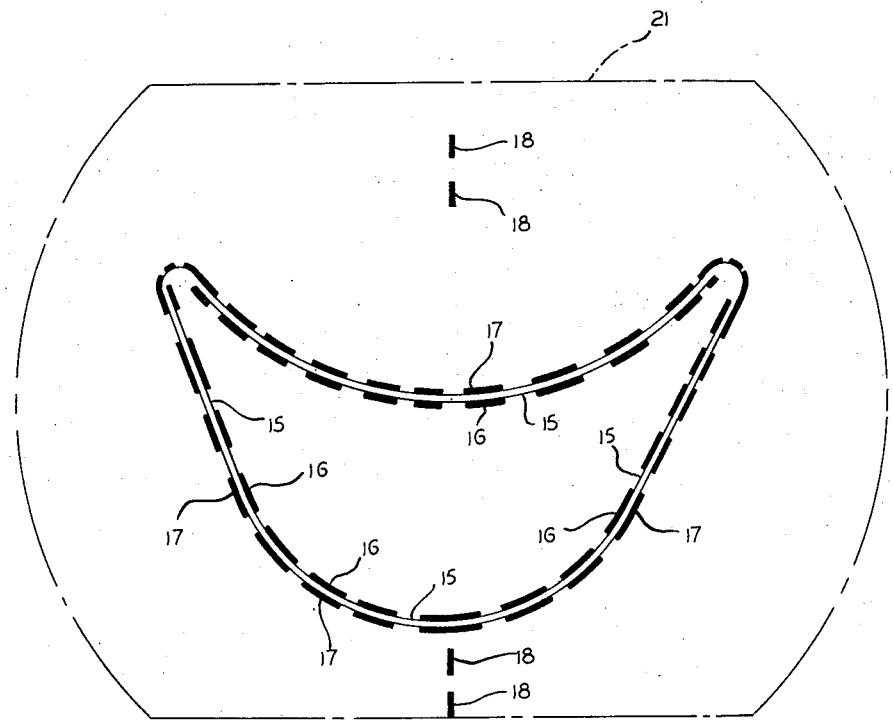
FIG. 3 shows a region of tolerance defined by parallel curves on a macroscope reticule suitable for use in checking the contour of FIG. 2.

Referring to FIG. 2, there is illustrated the blade contour of blades 11 and 12 as viewed along the axis of the blade, showing the upper cambered surface 13 and lower cambered surface 14. With reference to FIG. 3, there is illustrated a macroscope reticule suitable for checking the contour of FIG. 2. A tolerance band 15 generally of the shape of the contour of FIG. 2 is bounded by an inner curve adjacent the long edges of the heavy black lines 16 and an outer curve aligned along the long edges of the heavy black lines 17. The heavy black lines 18 are line-up lines for use in initially aligning the macroscope relative to the turbine wheel in a manner described below. The macroscope field of view is within the dash-dot line 21.

The view of the reticule in FIG. 3 is considerably enlarged in order to clearly show the orientation of the tolerance region and line-up lines within the macroscope field. For a typical reticule used in checking a small turview along line V—V of FIG. 4 which reveals additional structural details. Brake block 35 extends from front support block 55 which includes a groove 56 in which rack 27 rides over shim 46. The detail of the means for attaching left brake shoe 32 to the end 34 of brake block 35 is seen and rear shaft 31 is seen to be secured to inner shaft 57 by socket head screw 61 and keyed to the latter shaft by dowel 62. Gear 25 is keyed by key 63 to one-way clutch 64 which is retained by clutch retaining ring 68 whereby motion of gear 25 in only one direction is followed by shaft 57. Gear 25 is separated from shaft 57 by ball bearings 65 and the latter shaft is secured to hollow shaft 66 by screw 67. Hollow shaft 66 is rotatable within ball bearings 71—74, the lower race 75 of ball bearing 74 resting upon supporting structure 76 which is secured to base 22 by socket head screw 77. The lower

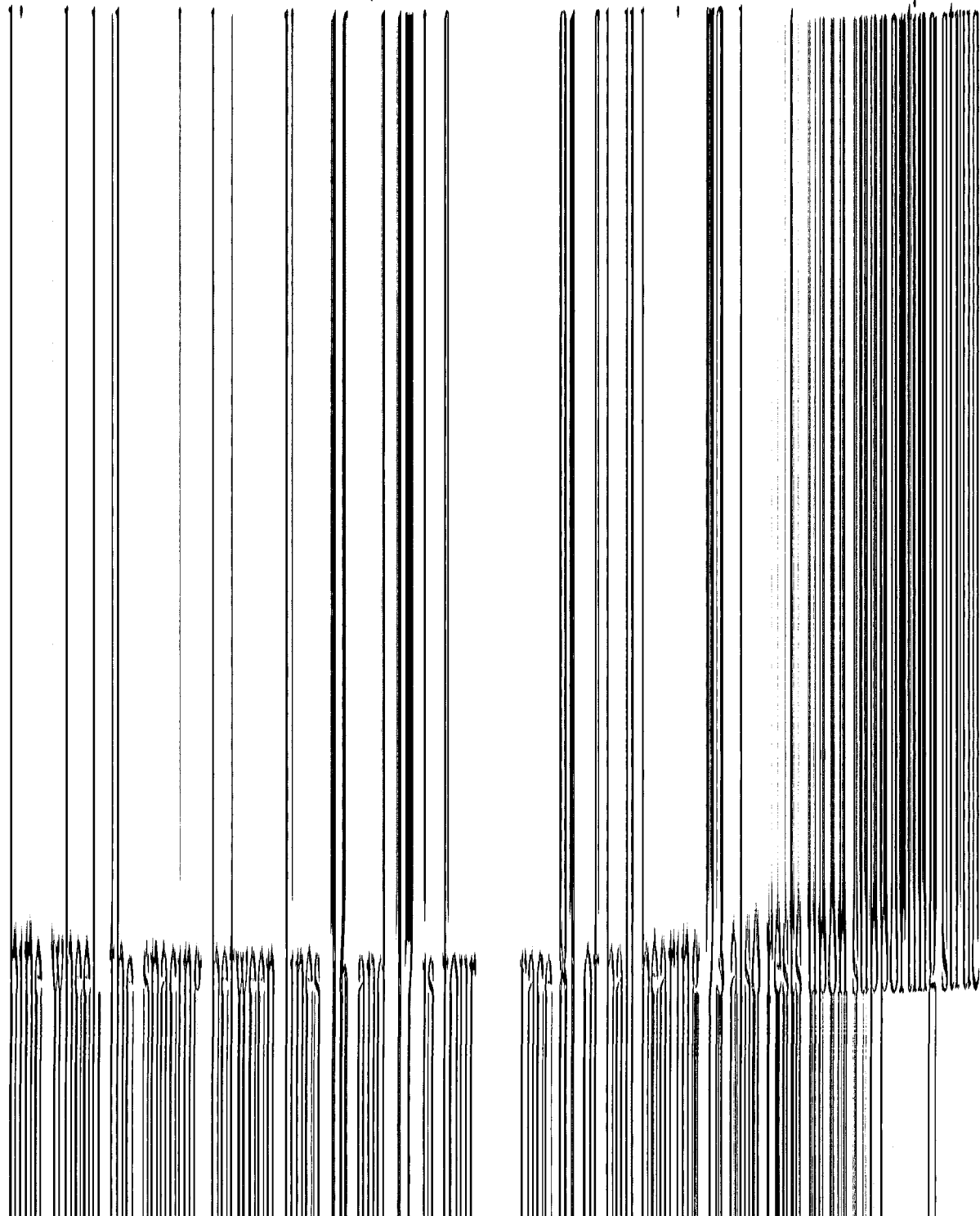

54 and spring button 147, respectively, the latter spring button pressing against spring 151 within yoke 53. A macroscope illuminator (not shown) is supported by support arms 152.

Figure 6:
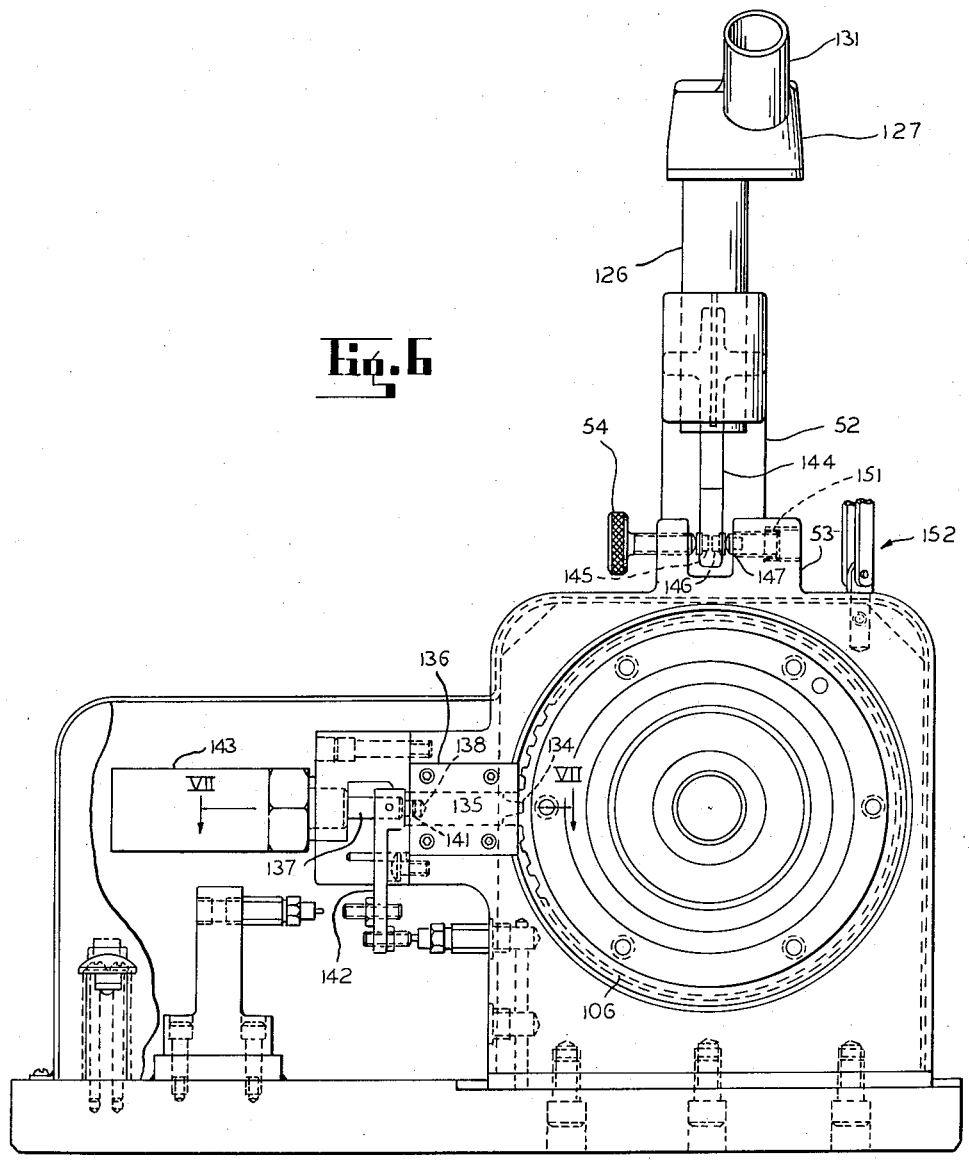
FIG. 6 is a section along line VI—VI of FIG. 5.

With reference to FIG. 7, there is illustrated a sectional view along line VII—VII of FIG. 6 for showing with greater clarity the manner in which index plug 135 within index plug retainer 136 engages index wheel 106 and is connected to plug 137 by screw 138, the latter plug being supported within bearing housing 142 and withdrawn into air cylinder 143.

Figure 5:
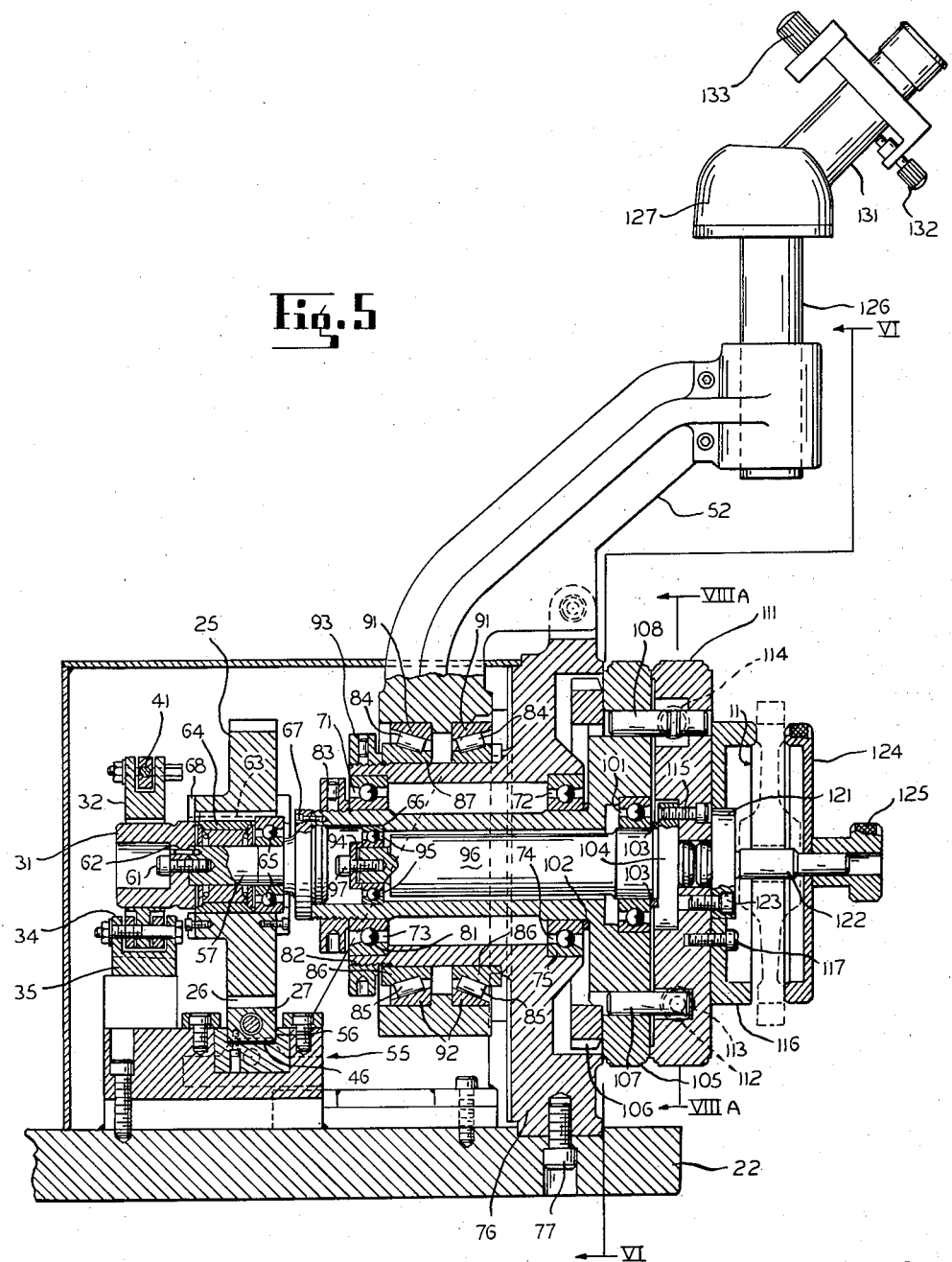
FIG. 5 is a section along line V—V of FIGURE 4.

Referring to FIG. 8, there is illustrated a sectional view along line VIIIA—VIIIA of FIG. 5 for showing the details by which radial tolerance wheel 111 is angularly displaced relative to drive plate 105 and index wheel 106 by no more than the desired tolerance within which a blade must be oriented. On either side of dowel 107 are centering pins 112 which are spring loaded by springs 113 to maintain the position of radial indexing plate 111 in its normal relation to index plate 106 and drive plate 105. Set screws 152 determine the range over which tolerance set screws 114 may be adjusted to vary the angular orientation of radial tolerance plate 111 relative to index wheel 106 and drive plate 105 by pressing against centering posts 108. The screws are adjustable through openings 152a.

With reference to FIG. 9, there is illustrated an arrangement for initially aligning the macroscope. FIGS. 9A and 9B are top and side views respectively of a set master plate properly positioned for initial alignment. A set master plate 161 is secured to a set master retainer 162 which is arranged to replace turbine wheel 11 and clamp 124 (FIG. 5). Contour 163 is cut out to conform exactly to the desired blade contour and groove 164 is cut in set master plate 161 for alignment purposes. Set master retainer 162 is then placed over locator shaft 122 and secured thereto by tightening set screw 125 and located relative to radial tolerance plate 111 and rest pad 116 as indicated.

Having thus described the detailed structural arrangement of the preferred embodiment, its mode of operation will be discussed. With reference to FIG. 9, the alignment procedure will first be described. With the set master plate 161 oriented as indicated, the position of contour 163 in set master plate 161 corresponds precisely to the proper location of a blade contour. Accordingly, set screws 132 and 133 are adjusted to position the reticle in eyepiece 131 so that the tolerance region 15 (FIG. 3) is seen exactly adjacent to one side of contour 163, both contour 163 and tolerance region 15 appearing in focus. Adjustment screw 54 (FIG. 6) is then rotated, thereby forcing rib 144 of macroscope housing 52, which rib is clamped between the end of adjusting screw 54 and spring button 147, to follow the translational motion of adjusting screw 54. Macroscope housing 52 rotates on roller bearings 84 and 85 about the axis of locator shaft 122 until the contour 163 is directly in the center of the tolerance region 15 and line-up lines 18 are precisely aligned along the left edge of groove 164. No further adjustments of the macroscope position need now be made, and the apparatus is now ready for checking the contours of turbine blades and the angular spacing therebetween.

Figure 4:
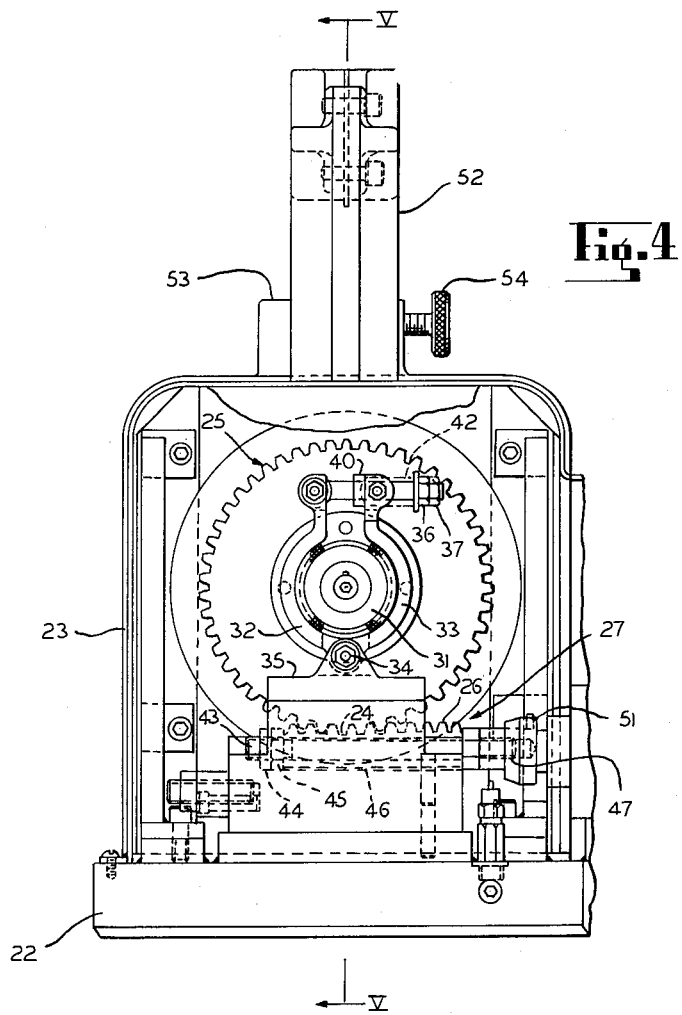
FIG. 4 is an end view of a preferred embodiment of the invention.

Set master retainer 162 is then removed and turbine wheel 11 mounted on locator shaft 122 with the master or reference blade pointed upward to macroscope 126. Clamp 124 is then placed over locator shaft 122 and against turbine wheel 11 with knob 125 being screwed on locator shaft 122 only tight enough to hold turbine wheel 11 stationary while permitting the latter to slide along the surface of rest pad 116 to permit initial adjustment of the wheel. The blade is then rotated slightly until the contour of the master blade is seen to be centered within the tolerance region 15. Knob 125 is then fully tightened and complete inspection of the wheel is ready to commence. Assuming that the contour of the master blade is viewed through macroscope 126 and seen to lie entirely within the region 15, the next blade is ready to be checked. To bring the next blade into position, index plug 135 (FIGS. 6 and 7) is rapidly withdrawn and a force is imparted upon rack 46 (FIG. 4). This force may be imparted manually, but preferably is applied substantially simultaneously with the withdrawal of index plug 135 by a compressed air system or electrical solenoidal system in response to operation of a control button or lever by the inspector. Rack 27 then slides to the left, thereby rotating gear 25 clockwise, which rotation is coupled by clutch 64 (FIG. 5) to shaft 57, hollow shaft 66, drive plate 105 of the latter, index wheel 106, radial tolerance plate 111, rest pad 116 and accordingly turbine wheel 11 clamped thereto by clamp 124.

When index plug 135 has been withdrawn, and radial tolerance wheel 106 commences to rotate, the withdrawing force in air cylinder 143 is released and the spring therein (not shown) applies pressure to index plug 135 whereby its tip rides along the edge of index wheel 106 until the next notch 134 is engaged to lock the wheel. The next blade contour may then be checked both for its shape and proper angular spacing from the master blade, since the angle through which index wheel 106 and accordingly turbine wheel 11 rotated was precisely equal to the desired angular spacing between blades as result of the precise spacing of notches 134.

If the inspector sees the contour of the blade now viewed entirely within the tolerance region, both the blade and its regular spacing from the master blade are passable and the operator may actuate an appropriate control switch or valve to bring the next blade into view. However, if the contour is not viewed entirely within the tolerance region 15 because of an error in blade spacing, the operator proceeds with an additional step to determine whether the deviation from the desired angular spacing is within tolerance. This is accomplished by appropriately adjusting tolerance set screws 114 (FIG. 8). Initially, these screws are adjusted so as not to press against centering posts 108. Then, the angular orientation of radial tolerance plate 111 relative to drive plate 105 and index plate 106 is maintained at a fixed value by the spring loaded screws 112 pressing against dowel 107. By withdrawing one of the screws 114 while screwing the other in further, the latter presses against centering posts 108, thereby causing the relative angular orientation of plate 111 to shift as one of the springs 113 is compressed while the other is expanded. The degree of angular adjustment which may be imparted by adjustment of screws 114 is limited by the position of set screws 152 upon which the heads of screws 114 rest when the maximum angular deviation is reached. Typically, the axial travel of screws 114 is limited to plus or minus .002 inch. The inspector may then adjust screws 114 in this manner, while observing the blade contour through eye-piece 131. If the contour is seen to lie entirely within tolerance region 15 after adjusting screws 114 within the limits determined by set screws 152, then the angular spacing between turbine blades is within tolerance and the operator may then inspect the next blade. The method described above is repeated until every blade on the turbine wheel has been inspected in this manner.

An understanding of the adjustments described above will be facilitated by referring to FIG. 8B which shows the relation of the screws 114 to centering posts 108 viewed in a plane which includes the axes of the centering posts.

It is, thus seen that the method and apparatus described above enables the turbine wheel to be rapidly inspected to meet close tolerances as to blade contours and the spacing between blades. The inspection process is free of complexity, thereby enabling a relatively inexperienced inspector to reliably inspect numerous parts each day. The inspecting apparatus is compact and the provision of special lighting facilities or large amounts of floor space is unnecessary. Although the invention has been described with respect to the inspection of turbine wheels, it is readily apparent that the disclosed principles are equally applicable to the inspection of other small parts and numerous modifications of and departures from the specific embodiment and steps described herein may be practiced by those skilled in the art without deviating from the inventive concepts. Consequently, the invention is to be construed as limited only by the spirit and scope of the appended claims.

We claim as our invention:

1. Apparatus for checking the contours of and spacing between small turbine wheel blades comprising, a macroscope with an eyepiece having a reticule with markings thereon defining a tolerance region generally of the shape of a blade contour, a supporting structure for mounting said macroscope, means for detachably securing said turbine wheel to said supporting structure whereby the axis of a first blade is aligned essentially along the macroscope axis permitting the contour of the former to be viewed through the latter, the latter means including an assembly rotatable about the turbine wheel axis which assembly includes an indexing plate and radial tolerance plate, said indexing plate having grooves spaced equiangularly about its periphery by an angle precisely equal to the desired angular spacing between adjacent turbine blades, said radial tolerance plate permitting selective angular motion of said turbine wheel relative to said assembly by no more than the tolerable deviation from the desired angle between adjacent blades, a plug adapted to engage one of said grooves to lock said assembly in a precise angular position, and means for withdrawing said plug and imparting angular momentum to said assembly whereby the latter rotates through said precise angle until said plug engages the groove adjacent to the one from which it was withdrawn.

2. Apparatus for checking the contours of and spacing between small turbine wheel blades, comprising, a macroscope with an eyepiece having a reticule with markings thereon defining a tolerance region generally of the shape of a blade contour, a supporting structure for mounting said macroscope, means for detachably securing said turbine wheel to said supporting structure whereby the axis of a first blade is aligned essentially along the macroscope axis permitting the contour of the former to be viewed through the latter, the latter means including an assembly rotatable about the turbine wheel axis which assembly includes an indexing plate and radial tolerance plate, said indexing plate having grooves spaced equiangularly about its periphery by an angle precisely equal to the desired angular spacing between adjacent turbine blades, said radial tolerance plate permitting selective angular motion of said turbine wheel relative to said assembly by no more than the tolerable deviation from the desired angle between adjacent blades, a plug adapted to engage one of said grooves to lock said assembly in a precise angular position, means for withdrawing said plug, a gear coupled to said assembly by means including a one-way clutch, a rack in which said gear rides, and means for imparting translational motion to said rack when said plug is withdrawn to rotate said gear in the direction whereby the motion of the latter is coupled through said one-way clutch to rotate said assembly through said precise angle until said plug engages the groove adjacent to the one from which it was withdrawn.

References Cited in the file of this patent

UNITED STATES PATENTS

| | | |
|---|---|---|
| 1,377,069 | Hartness | May 3, 1921 |
| 2,389,544 | Peck et al. | Nov. 20, 1945 |
| 2,487,314 | Coles | Nov. 8, 1949 |
| 2,580,239 | Murch et al. | Dec. 25, 1951 |
| 2,796,672 | Oesterheld | June 25, 1957 |
| 2,802,393 | Young | Aug. 13, 1957 |